(12) United States Patent
Warner

(10) Patent No.: US 11,551,521 B2
(45) Date of Patent: *Jan. 10, 2023

(54) SYSTEMS AND METHODS FOR ELECTRONIC FUND TRANSFERS FOR USE WITH GAMING SYSTEMS

(71) Applicant: AUTOMATED CASHLESS SYSTEMS, INC., Reno, NV (US)

(72) Inventor: Stephen L. Warner, Zephyr Cove, NV (US)

(73) Assignee: AUTOMATED CASHLESS SYSTEMS, INC., Reno, NV (US)

( * ) Notice: Subject to any disclaimer, the term of this patent is extended or adjusted under 35 U.S.C. 154(b) by 99 days.

This patent is subject to a terminal disclaimer.

(21) Appl. No.: 16/927,770

(22) Filed: Jul. 13, 2020

(65) Prior Publication Data

US 2021/0074122 A1     Mar. 11, 2021

Related U.S. Application Data

(60) Continuation of application No. 15/870,998, filed on Jan. 14, 2018, now Pat. No. 10,713,890, which is a
(Continued)

(51) Int. Cl.
*G06F 17/00* (2019.01)
*G07F 17/32* (2006.01)
(Continued)

(52) U.S. Cl.
CPC ....... *G07F 17/3244* (2013.01); *G06Q 20/027* (2013.01); *G06Q 20/10* (2013.01);
(Continued)

(58) Field of Classification Search
CPC .. G06Q 20/027; G06Q 20/1085; G06Q 20/18; G06Q 20/204; G06Q 20/206; G07F 17/32; G07F 19/20
(Continued)

(56) References Cited

U.S. PATENT DOCUMENTS 5,259,613 A    11/1993  Marnell
5,415,416 A     5/1995  Scagnelli et al.
(Continued)

FOREIGN PATENT DOCUMENTS

GB       2461975 A      1/2010
KR    200291099 Y1     10/2002
(Continued)

OTHER PUBLICATIONS

U.S. Appl. No. 61/086,205, filed Aug. 5, 2008 to Agarwal et al. US PG pub 2011/0263,318, (Year: 2008).*

*Primary Examiner* — Michael A Cuff
(74) *Attorney, Agent, or Firm* — Kerr IP Group, LLC

(57) ABSTRACT

Electronic fund transfer (EFT) systems and methods are disclosed for managing and transferring electronic funds from a patron's financial account to provide credit in physical form. The systems comprise an electronic fund transfer (EFT) terminal, at least one credit system, and a gateway in communication with the EFT terminal, the at least one credit system, and a financial network. The EFT terminal is configured to communicate with the patron's financial account via the gateway and the financial network to electronically transfer funds at the patron's request.

23 Claims, 6 Drawing Sheets

Related U.S. Application Data continuation of application No. 14/588,936, filed on Jan. 3, 2015, now Pat. No. 9,875,611, which is a division of application No. 14/210,456, filed on Mar. 14, 2014, now Pat. No. 8,968,075, which is a continuation of application No. 13/156,444, filed on Jun. 9, 2011, now Pat. No. 8,715,066.

(60) Provisional application No. 61/354,339, filed on Jun. 14, 2010.

(51) Int. Cl.
    *G06Q 20/10*     (2012.01)
    *G06Q 40/02*     (2012.01)
    *G06Q 50/34*     (2012.01)
    *G06Q 20/02*     (2012.01)

(52) U.S. Cl.
    CPC ......... *G06Q 20/1085* (2013.01); *G06Q 40/02* (2013.01); *G06Q 50/34* (2013.01); *G07F 17/32* (2013.01)

(58) Field of Classification Search
    USPC .............................................. 463/25, 29, 42
    See application file for complete search history.

(56) References Cited

U.S. PATENT DOCUMENTS

| | | | |
|---|---|---|---|
| 5,557,086 | A | 9/1996 | Schulze et al. |
| 5,618,045 | A | 4/1997 | Kagan et al. |
| 5,702,305 | A | 12/1997 | Norman et al. |
| 5,759,103 | A | 6/1998 | Freels et al. |
| 5,761,647 | A | 6/1998 | Boushy |
| 5,866,586 | A | 2/1999 | Forbes et al. |
| 6,014,648 | A | 1/2000 | Brennan |
| 6,098,053 | A * | 8/2000 | Slater ................... G06Q 20/02 705/35 |
| 6,251,014 | B1 | 6/2001 | Stockdale et al. |
| 6,287,200 | B1 | 9/2001 | Sharma |
| 6,304,860 | B1 | 10/2001 | Martin, Jr. et al. |
| 6,508,710 | B1 | 1/2003 | Paravia et al. |
| 6,511,377 | B1 | 1/2003 | Weiss |
| 6,524,189 | B1 | 2/2003 | Rautila |
| 6,547,131 | B1 | 4/2003 | Foodman et al. |
| 6,629,890 | B2 | 10/2003 | Johnson |
| 6,645,077 | B2 | 11/2003 | Rowe |
| 6,674,995 | B1 | 1/2004 | Meyers et al. |
| 6,793,134 | B2 | 9/2004 | Clark |
| 6,866,586 | B2 | 3/2005 | Oberberger et al. |
| 6,890,258 | B2 | 5/2005 | Weiss |
| 6,893,347 | B1 | 5/2005 | Zilliacus et al. |
| 6,997,807 | B2 | 2/2006 | Weiss |
| 7,004,837 | B1 | 2/2006 | Crowder, Jr. et al. |
| 7,137,889 | B1 | 11/2006 | Luciano, Jr. |
| 7,201,160 | B2 | 4/2007 | Yoshiume et al. |
| 7,201,660 | B2 | 4/2007 | Kiely et al. |
| 7,217,190 | B2 | 5/2007 | Weiss |
| 7,232,371 | B2 | 6/2007 | Gatto et al. |
| 7,455,591 | B2 | 11/2008 | Nguyen |
| 7,625,279 | B1 | 12/2009 | Luciano, Jr. et al. |
| 7,780,526 | B2 | 8/2010 | Nguyen et al. |
| 7,819,742 | B2 | 10/2010 | Chamberlain et al. |
| 7,828,647 | B1 | 11/2010 | Luciano |
| 7,844,255 | B2 | 11/2010 | Petrov et al. |
| 7,846,020 | B2 | 12/2010 | Walker et al. |
| 7,857,207 | B1 | 12/2010 | Hopkins, III |
| 7,861,002 | B2 | 12/2010 | Puon et al. |
| 7,972,214 | B2 | 7/2011 | Kinsley et al. |
| 3,021,231 | A1 | 9/2011 | Walker et al. |
| 8,038,532 | B2 | 10/2011 | Neervoort et al. |
| 8,282,748 | B2 | 10/2012 | Moll et al. |
| 8,306,879 | B2 | 11/2012 | Nonaka |
| 8,388,448 | B2 | 3/2013 | Kinsley et al. |
| 8,715,066 | B2 | 5/2014 | Prather et al. |
| 8,876,594 | B2 | 11/2014 | Holch et al. |
| 8,956,233 | B2 | 2/2015 | Tanaka et al. |
| 8,968,075 | B2 | 3/2015 | Warner |
| 8,977,680 | B2 | 3/2015 | Gibson et al. |
| 8,979,642 | B2 | 3/2015 | Warner |
| 8,979,643 | B2 | 3/2015 | Warner |
| 8,979,644 | B2 | 3/2015 | Warner |
| 9,171,303 | B2 | 10/2015 | Potts et al. |
| 9,294,604 | B1 | 3/2016 | Wagner |
| 9,586,139 | B2 | 3/2017 | Jabara et al. |
| 9,662,571 | B1 | 5/2017 | Jabara et al. |
| 9,728,039 | B2 | 8/2017 | Warner et al. |
| 9,830,772 | B2 | 11/2017 | Reaves et al. |
| 9,900,776 | B1 | 2/2018 | Noonan |
| 2002/0006825 | A1 | 1/2002 | Suzuki |
| 2002/0032656 | A1 | 3/2002 | Chen |
| 2002/0042297 | A1 | 4/2002 | Torango |
| 2002/0183110 | A1 | 12/2002 | Flanagan-Parks et al. |
| 2003/0003996 | A1 | 1/2003 | Nguyen et al. |
| 2003/0022719 | A1 | 1/2003 | Donald et al. |
| 2003/0073494 | A1 | 4/2003 | Kalpakian et al. |
| 2003/0083127 | A1 | 5/2003 | Weiss |
| 2003/0087692 | A1 | 5/2003 | Weiss |
| 2003/0145205 | A1 | 7/2003 | Sarcanin |
| 2003/0228898 | A1 | 12/2003 | Rowe |
| 2004/0087360 | A1 | 5/2004 | Chamberlain et al. |
| 2004/0093309 | A1 | 5/2004 | Nakamura et al. |
| 2004/0147309 | A1 | 7/2004 | Chamberlain et al. |
| 2004/0188221 | A1 | 9/2004 | Carter |
| 2004/0253979 | A1 | 12/2004 | Burr |
| 2005/0065876 | A1 * | 3/2005 | Kumar ................ G06Q 20/322 705/39 |
| 2005/0090308 | A1 | 4/2005 | Weiss |
| 2005/0097017 | A1 | 5/2005 | Hanratty |
| 2005/0107155 | A1 | 5/2005 | Potts et al. |
| 2005/0107156 | A1 | 5/2005 | Potts et al. |
| 2005/0119979 | A1 * | 6/2005 | Murashita ............ G06K 7/0004 705/67 |
| 2005/0261058 | A1 | 11/2005 | Nguyen et al. |
| 2005/0266919 | A1 | 12/2005 | Rowe et al. |
| 2006/0111168 | A1 | 5/2006 | Nguyen et al. |
| 2006/0160610 | A1 | 7/2006 | Potts |
| 2006/0172798 | A1 | 8/2006 | Crowder et al. |
| 2006/0205481 | A1 | 9/2006 | Dominelli |
| 2006/0218091 | A1 | 9/2006 | Choy |
| 2007/0060363 | A1 | 3/2007 | Nguyen et al. |
| 2007/0225068 | A1 | 9/2007 | Weiss |
| 2007/0246531 | A1 | 10/2007 | Dabrowski |
| 2007/0282858 | A1 | 12/2007 | Amer et al. |
| 2008/0015014 | A1 | 1/2008 | Weiss |
| 2008/0027860 | A1 | 1/2008 | Mullen et al. |
| 2008/0113776 | A1 | 5/2008 | Sommer |
| 2008/0119284 | A1 | 5/2008 | Luciano et al. |
| 2008/0139303 | A1 | 6/2008 | Patterson |
| 2008/0153583 | A1 | 6/2008 | Huntley et al. |
| 2008/0183605 | A1 | 7/2008 | Taraboulsi |
| 2008/0242403 | A1 | 10/2008 | Weiss |
| 2009/0005157 | A1 | 1/2009 | Netley et al. |
| 2009/0005159 | A1 | 1/2009 | Netley et al. |
| 2009/0030694 | A1 | 1/2009 | Stern |
| 2009/0099965 | A1 | 4/2009 | Grant, IV |
| 2009/0104954 | A1 | 4/2009 | Weber et al. |
| 2009/0131146 | A1 | 5/2009 | Arezina et al. |
| 2009/0138369 | A1 | 5/2009 | Raja |
| 2009/0221366 | A1 | 9/2009 | Ward et al. |
| 2009/0265270 | A1 * | 10/2009 | Gangaraju ........... G06Q 20/105 705/41 |
| 2009/0287524 | A1 | 11/2009 | Gnoato |
| 2009/0291755 | A1 | 11/2009 | Walker et al. |
| 2009/0298576 | A1 | 12/2009 | Nguyen |
| 2009/0299848 | A1 | 12/2009 | Cao et al. |
| 2009/0305765 | A1 | 12/2009 | Walker et al. |
| 2010/0062834 | A1 | 3/2010 | Ryan |
| 2010/0130284 | A1 | 5/2010 | Luciano, Jr. et al. |
| 2010/0197383 | A1 | 8/2010 | Rader et al. |
| 2010/0222132 | A1 | 9/2010 | Sanford et al. |
| 2011/0086696 | A1 | 4/2011 | MacEwan |
| 2011/0230260 | A1 | 9/2011 | Morrow et al. |
| 2011/0250972 | A1 | 10/2011 | Horbay et al. |

(56) References Cited

U.S. PATENT DOCUMENTS

| | | |
|---|---|---|
| 2011/0263318 A1* | 10/2011 | Agarwal ................. G07F 17/32 463/25 |
| 2012/0100908 A1 | 4/2012 | Wells et al. |
| 2012/0142403 A1 | 6/2012 | Prather et al. |
| 2012/0144461 A1 | 6/2012 | Rathbun |
| 2012/0258795 A1 | 10/2012 | Ryan |
| 2013/0172078 A1 | 7/2013 | Boyd et al. |
| 2014/0025200 A1 | 1/2014 | Smith |
| 2014/0094256 A1 | 4/2014 | Hilbert et al. |
| 2014/0194193 A1 | 7/2014 | Warner |
| 2014/0194194 A1 | 7/2014 | Warner |
| 2014/0194195 A1 | 7/2014 | Warner |
| 2014/0200073 A1 | 7/2014 | Warner |
| 2015/0148120 A1 | 5/2015 | Warner |
| 2015/0187177 A1 | 7/2015 | Warner et al. |
| 2015/0339654 A1 | 11/2015 | Warner et al. |
| 2016/0027252 A1 | 1/2016 | Warner et al. |

FOREIGN PATENT DOCUMENTS

| | | |
|---|---|---|
| KR | 1020060049945 A | 5/2006 |
| WO | 1996034345 A1 | 10/1996 |

* cited by examiner

SYSTEMS AND METHODS FOR ELECTRONIC FUND TRANSFERS FOR USE WITH GAMING SYSTEMS

RELATED APPLICATIONS

This application is a Continuation of pending U.S. patent application Ser. No. 15/870,998, filed on Jan. 14, 2018 entitled SYSTEMS AND METHODS FOR ELECTRONIC FUND TRANSFERS FOR USE WITH GAMING SYSTEMS, which was a Continuation of U.S. patent application Ser. No. 14/588,936 (now U.S. Pat. No. 9,875,611), filed on Jan. 3, 2015 entitled SYSTEMS AND METHODS FOR ELECTRONIC FUND TRANSFERS FOR USE WITH GAMING SYSTEMS, which was a Division of U.S. patent application Ser. No. 14/210,456 (U.S. Pat. No. 8,968,075), filed on Mar. 14, 2014 entitled SYSTEMS AND METHODS FOR ELECTRONIC FUND TRANSFERS FOR USE WITH GAMING SYSTEMS, which was a Continuation of U.S. patent application Ser. No. 13/156,444 (now U.S. Pat. No. 8,715,066), filed on Jun. 9, 2011 entitled SYSTEMS AND METHODS FOR ELECTRONIC FUND TRANSFERS FOR USE WITH GAMING SYSTEMS, which claimed priority from U.S. Provisional Patent Application No. 61/354,339, filed on Jun. 14, 2010 and entitled SYSTEM AND METHOD FOR WIRELESS ELECTRONIC FUND TRANSFERS FOR USE WITH GAMING SYSTEMS.

The instant continuation application is commonly owned with, claims the benefit of, and incorporates herein by reference in their entireties for all useful purposes, all five applications enumerated above (Ser. Nos. 15/870,998, 14/588,936, 14/210,456, 13/156,444, and 61/354,339). All of the material in this continuation application has an effective filing date before Mar. 16, 2013, and therefore this application is subject to the provisions of the pre-AIA (first to invent) examination standards in effect prior to that date.

FIELD OF THE INVENTION

The present invention relates to a system and a method for electronic fund transfers, and in particular to electronic fund transfers for use with gaming systems.

BACKGROUND OF THE INVENTION

Currently, the primary method of transferring funds into a gaming device is through cash or cash equivalents, including "cash value tickets" and ticket-in/ticket-out (TITO) tickets. Similarly, funds are transferred into an amusement device through cash, "cash value cards", game tokens, or coupons. The funds are usually converted into gaming or amusement credits through a cash acceptance device such as a bill acceptor or card reader associated with the gaming device. The gaming or amusement credits are then exported onto cash value tickets or value on a card to be used in a gaming or amusement facility. At the discretion of the patron, the gaming or amusement credits can be redeemed and converted back into cash. A ticketing system or a value card system is used to read the tickets, print tickets, or write onto the value card the amount to be cashed out at an external kiosk or cashier station.

A patron usually accesses funds in his financial account via an ATM machine or cash machine. While playing a game, if a patron runs out of cash and needs to access the funds in his bank account, he must stop the play at the gaming or amusement device, find an ATM machine, extract cash, convert the cash into a cash equivalent (if necessary) and then return to the gaming or amusement device, and if it is not already occupied, insert the cash or the cash equivalent into the gaming or amusement device to continue play. Many players find this interruption in the gaming process not desirable, primarily because they don't want to lose their gaming device or position. Therefore, there is a need for a more convenient way for the patrons to access their funds while playing in a gaming or amusement device without having to leave their device or position.

An ATM or cash machine operates over an ATM network such as NYCE, PLUS, STAR, to transfer money from a cardholder's financial account to the ATM operator's account. The ATM operator or the property owner of the facility where the ATM is positioned and operated is responsible for loading the cash supply in the ATM, for the security of the cash, and for the maintenance of the ATM machine. Normally an ATM is connected to an ATM network, which is then connected to the customers' financial account. Financial institutions and banks have signed contracts with the ATM network to transfer money out of the customer's financial or bank account to the ATM network, and the ATM network pays the operator of the ATM.

A gaming device that accepts cash or cash equivalent funds from a patron, holds the funds in the form of "game credits" while the patron plays at the gaming or amusement device, and enables the patron to retrieve his funds at any time. Therefore, gaming and amusement devices do not require the patron to input a wagerable or playable amount of money in the gaming or amusement device each time the player wishes to play a device. When the patron wins, the gaming or amusement devices do not require the patron to immediately take the winnings if the patron desires to continue play. Furthermore, gaming or amusement devices provide a mechanism by which the patron can input and maintain a pool of money (i.e., credits) or amusement credits of non-cash value in the gaming or amusement device to play many games of the gaming or amusement device. The gaming or amusement device can also accumulate and store the patron's winnings. When the patron wishes to stop playing, the gaming or amusement devices provide a mechanism by which the patron can retrieve the money or non-cash value credits that remain in the pool. Accordingly, there is a need for an efficient fund transfer process to a gaming or amusement device that does not include the inefficient conversion of funds from bank accounts to cash to credit. There is also a need for a fund transfer process to a gaming or amusement device that does not require a large amount of cash in float in the gaming or amusement devices throughout the gaming or amusement facility. There is also a need for a less costly way for providing funds for gaming/amusement purposes.

Problems facing the current electronic funds transfer systems include security and fund transfer confirmation. Many regulatory agencies do not approve electronic funds transfer systems that do not confirm the fund transfer, i.e., there is no lasting evidence that a fund transfer has occurred. Therefore, the electronic fund transfer system needs to provide such evidence so that electronic funds transfers can occur in a more secure fashion. Accordingly, there is a need to make a secure electronic funds transfer system. A further need exists to provide evidence of the electronic transaction. A still further need exists to provide a wireless electronic fund transfer system designed to place the funds in the patron's hands rather than directly in the credit meter of the gaming device.

Further, in current gaming systems, because the transfer of money to game play is seamless, the gaming or amusement device is required to have the ability to send and receive authorization information, realize an amount of money that has been transferred, convert the money amount into a game or amusement credit amount, add or subtract an amount of credits that the player thereafter wins or loses and issue an appropriate cash out when the player desires. Accordingly, the game device's processor handles the normal game accounting in combination with the electronic funds transfer accounting.

Card and/or ticket systems are also used in connection with gaming or amusement machines in cases where the gaming or amusement machines issue and accept cards and/or tickets in lieu of money. Such systems provide a workable cashless system on a local or property level. The casino operator redeems an amount of money from the card system for the assigned card and/or from the value imprinted on the ticket through visual inspection or via a ticket validation system. Card and/or ticketing systems are advantageous because they reduce the amount of cash transactions and the need for the patron to transport and hold large amounts of cash or coins. Consequently, ticketing systems have become common in most gaming and amusement jurisdictions. Various manufacturers produce these types of ticketing systems. These systems require each machine to have a card reader and/or ticket printer.

The role of the card reader device and/or ticketing machines has recently been expanded to enable patrons to redeem the card value and/or ticket at a gaming or amusement device. As before, the card and/or ticketing system issues cash out card credit to the card system and/or ticket in response to a patron's cash out request. In the expanded role, the cash out card and/or ticket includes information that enables the patron to present the card and/or ticket to a cashier or redemption machine, as before, or to re-insert the card and/or ticket into a gaming or amusement device configured to accept card and/or ticket transactions.

In this expanded role, the card and/or ticket accepting gaming or amusement devices must now contain a card and/or ticket reader as well as the card system communication and/or ticket printer. In the expanded system, the cash out card communicates with a local card system which tracks date and time of cash out credits for the identification card and the ticket typically contains a barcode, a written ticket amount, the time and date of printing, a numerical representation of the barcode, and other identification and validation information specific to the property. To redeem the card and/or ticket for its cash or non-cash value, the patron either presents the card and/or ticket to the operator who validates the card and/or ticket and pays the patron an amount of money or prizes, or the patron inserts the card and/or ticket into a card and/or ticket-ready gaming or amusement device whereby the gaming or amusement device provides the patron with a number of credits equal to the amount represented by or encoded in the card system or on the ticket.

The controllers of the card and/or ticket-ready gaming devices are adapted to coordinate with the card and/or ticket validation system. For example, when a payout is issued the card and/or ticket is inserted into a card and/or ticket reader equipped in a gaming or amusement device, the ticket reader forwards information, which can be stored on a barcode in the instance of tickets, to the game's or amusement's controller. The game or amusement controller recognizes this information as card and/or ticket information and forwards the card and/or ticket information to a card and/or ticket validation system outside the gaming or amusement device. The card and/or ticket validation system analyzes the card and/or ticket information, and if the card and/or ticket is valid, the card and/or ticket validation system provides the game or amusement controller with an authorization to credit the gaming machine with the amount represented by the credits in the card system or represented by encoded value on the ticket.

Alternatively, if the card and/or ticket validation system detects that the card and/or ticket is not valid, the card and/or ticket validation system instructs the game or amusement controller to reject the card and/or ticket. The card and/or ticket validation system may also log the failed attempt in a statistical database that will record the Information for future reference.

Card and/or ticketing benefits each patron, not just those wishing to access funds from or near the gaming and/or amusement device. Gaming and amusement establishments have also become familiar with the card and ticketing systems and their proven performance. Card and ticketing systems are proliferating within the gaming and amusement industry.

Accordingly, a need exists for an electronic funds transfer system that eliminates the inefficiency of the intermediary step of having to use an ATM cash machine to transfer money from a patron's bank account to a gaming device. Furthermore, a need exists for an electronic funds transfer system that utilizes the card and/or ticketing system's hardware and software as much as possible to avoid duplication of such hardware and software in accounting for the transfer of the electronic funds.

SUMMARY OF THE INVENTION

The present invention provides systems and methods for electronic funds transfers that originate from a casino game using an electronic funds transfer (EFT) terminal to withdraw money electronically from a patron's financial account and to transfer credit to the casino game. The EFT terminal accepts secure card based or wireless transactions at a casino game. A gateway routes transactions to a network associated with the patron's financial account. The gateway receives authorization for an electronic funds transfer and communicates an authorization to dispense credits to the at least one credit system. The at least one credit system dispenses credits suitable for use with the at least one casino game to the patron.

In one aspect, the electronic fund transfer system for managing and transferring electronic funds from a patron's financial account to a credit system includes, an electronic fund transfer (EFT) terminal that is a mobile handheld device that is remote from the casino game.

Implementations of the electronic fund transfer system may include one or more of the following features. The physical credit may be redeemable vouchers or casino chips. The EFT terminal may be a Payment Card Industry (PCI) and Pin Entry Device (PED) certified device, including a point-of-sale (POS) personal identification number (PIN) entry keypad, a payment card reader, a display, network connectivity modules, a printer, a printer port, mobile applications and one or more EFT applications. The payment card reader may be a smart card reader, magnetic card reader, contactless card reader, proximity mobile payments reader that enables communication with smart phone devices or contactless proximity card reader that processes secure smart ticketing and electronic payments using contactless secure mobile commerce technology. One of the EFT applications may be a patron interface application and the patron interface application includes one or more fields identifying the credit system to which the electronic funds are to be transferred, financial network, type of transaction, electronic fund amount to be transferred, date, time, name of host system, or name of patron. The casino game may be a slot machine, a table game, a betting parlor, kiosk, poker, pan, pai gow, race and sports book, race track, pari-mutuel betting, keno, bingo, or an amusement device. The financial network may be one of PLUS, STAR, CIRRUS, INTERLINK, MONEY PASS or NYCE.

In another embodiment, the invention features an electronic fund transfer method for managing and transferring electronic funds from a patron's financial account to a credit system. The method includes the following steps. Providing at least one casino game. Providing a gateway. Providing an electronic fund transfer (EFT) terminal in electronic communication with the gateway. Providing instructions to initiate an electronic funds transfer (EFT) from a patron's financial account via a patron using the EFT terminal. Generating a request for an EFT using the instructions to initiate an EFT provided by the patron from the EFT terminal. Communicating the request for an EFT from the EFT terminal to the gateway. Communicating the request for an EFT from the gateway to a financial server associated with the financial account via a network associated with the financial server. Receiving an electronic funds transfer from the financial server via the network associated with the financial server from the gateway. Communicating the electronic funds transfer from the gateway to a computing device. Generating an authorization to dispense credits to the patron with the gateway. Communicating the authorization to dispense credits from the gateway to a credit system and dispensing credits to the patron via the credit system.

In a further embodiment, the method for managing and transferring electronic funds from a patron's financial account to a credit system includes the steps of inserting a payment card into an EFT terminal; selecting payment transaction type and account; entering a PIN; and indicating acceptance of any service charge fees.

Among the advantages of this invention may be one or more of the following. The invention provides a casino game with an EFT system that employs existing card and ticket system hardware where applicable. The EFT system incorporates ticketing and banking networks. Furthermore, the invention provides a method of electronically transferring funds to the patron for subsequent gaming or non-gaming uses. Yet another advantage of the present invention is to provide a receipt to the patron so that the patron has a record or evidence of the electronic fund transaction. The present invention provides convenience to patrons and efficiency and cost savings to casino facilities.

DETAILED DESCRIPTION OF THE INVENTION

Figure 1:
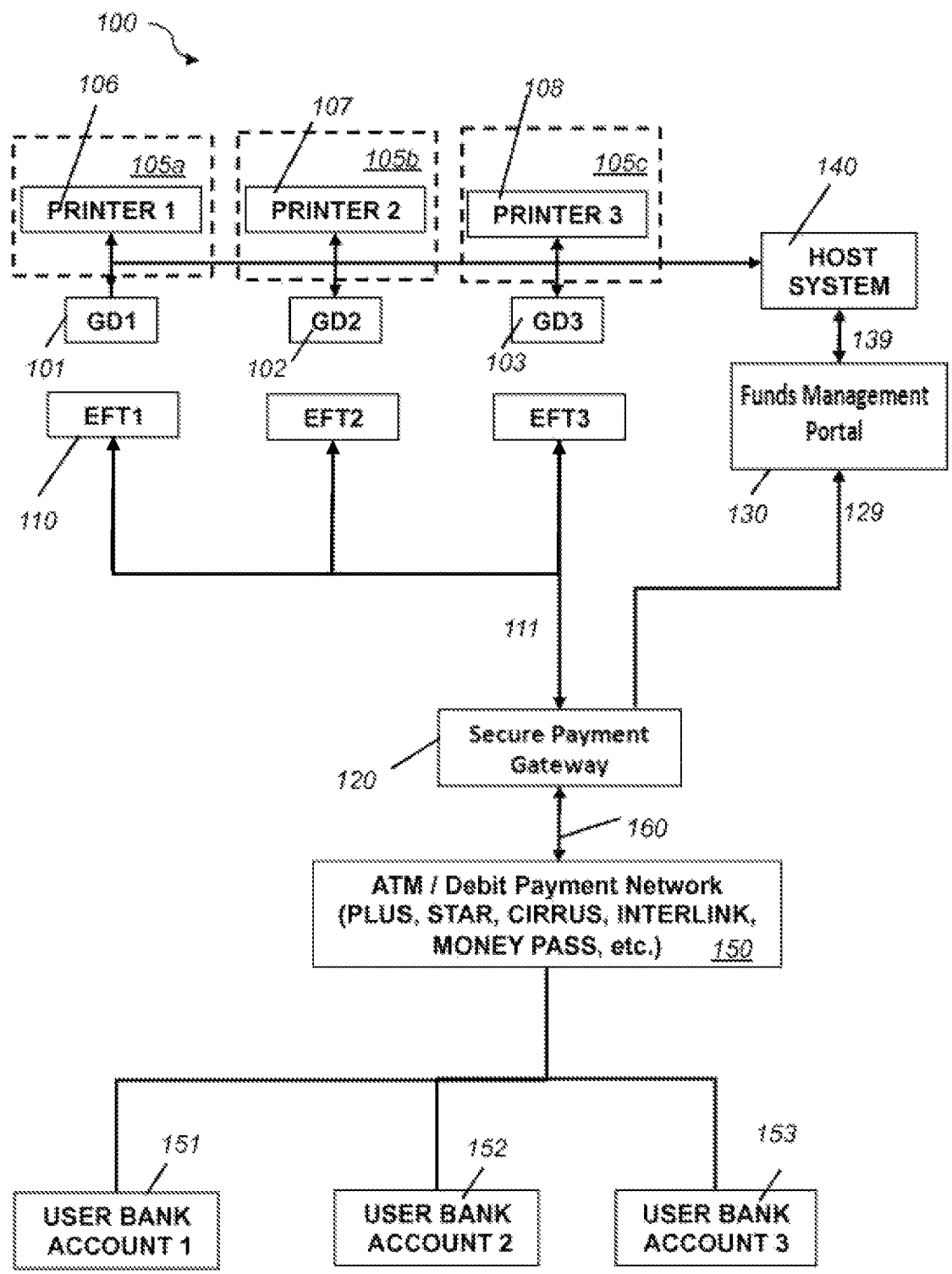
FIG. 1 is an overview diagram of the EFT system.

The present invention relates in general to an electronic funds transfer (EFT) system for transferring gaming credits to gaming or amusement devices.

The gaming or amusement device system normally contains a cash acceptance device (bill acceptor) to convert cash into credits for play. It may also contain a loyalty card system and/or a ticketing system that includes a ticket reader and a ticket printer to print tickets when the patron is ready to "Cash Out" such that the value remaining in the gaming or amusement device can be printed on the ticket with a special barcode or system recognizable code for use in another machine or can be redeemed for cash with a cashier or attendant in the specific gaming or amusement facility. Normally, credit is issued on the gaming or amusement device when cash is inserted into the device, or a ticket with value on it is read by the device, or a loyalty card is read which can provide free play, thus allowing the patron to play the game. If a patron is playing on a gaming device and runs out of credit and has no more cash to put into the gaming or amusement device, the patron is forced to leave the gaming or amusement device in order to find an ATM cash machine, kiosk, or cashier station to withdraw cash and then return to the gaming or amusement device.

The EFT System contains a secure ATM-like terminal with PIN (Personal Identification Number) pad that is Payment Card Industry (PCI), PIN Entry Device (PED) certified along with a magnetic stripe and smart card reader and a display which allows the patron to obtain cash equivalent without having to leave and find a ATM machine. The EFT terminal can be an external attachment to the gaming or amusement device or embedded in the gaming or amusement device. Each EFT terminal is associated with a specific gaming or amusement device. The process works similar to an ATM process.

When the patron swipes his debit card, enters a PIN, and requests a specific amount to be debited from his account (for a fee), the EFT terminal sends a secured request via a wireless or wired data network, through the EFT system out to a financial network for approval or denial of an ATM debit transaction request. If the transaction request is approved, the EFT system provides authorized cash value credits to be sent back to a host system. The host system initiates and prints a ticket with the transferred amount of value, at the specific gaming device where the EFT terminal is located. Alternatively, the host system updates the patron's loyalty/prepaid debit card account with the transferred amount of fund. The patron can use the card or ticket on a variety of gaming or amusement devices to receive game credits or redeem the card or ticket for cash through the authorized gaming or amusement device system.

The card and/or ticket validation system is connected to or is in communication with a card and/or ticket validation network. The card and/or ticket validation system includes a card and/or ticket validation server and operator interfaces to enable the operators to redeem card credits and/or tickets as well as to monitor card and/or ticketing transactions. The card and/or ticket validation network enables a plurality of gaming or amusement device processors in the same casino or property establishment to communicate with the same card and/or ticket validation system.

The ticket reader uses software for reading the barcode of a ticket, and after reading the barcode, the ticket reader passes the barcode information to the processor of the gaming or amusement device. The gaming or amusement device then forwards the barcode information to the ticket validation system via the ticket validation network to verify its authenticity. After verifying the authenticity, the ticket validation system presents an authorization to the gaming or amusement device for the ticket amount, via the ticket validation network, and the gaming device in turn adds credits to its credit meter in the amount authorized by the ticket validation system. Finally, the gaming or amusement device instructs the ticket reader to retain the used ticket internally so that it is not returned to the presenter.

The ticket validation network is thus preferably a local area network. This local area network, in turn, is connected to or is in communication with a secure payment gateway that validates electronic fund requests. The gaming devices are also equipped with EFT terminals (electronic funds transfer ATM units) that control a card reader, a secure PCI certified PIN Pad and a display for enabling a patron to enter the patron's account number, transaction type (i.e., credit or debit), desired transfer amount and personal identification number (PIN). The display prompts the patron for such information and informs the patron of fund request approvals and rejections. A printer may be attached to print out a receipt for evidence of the transaction.

The present invention enables the patron to enter the required fund transfer information, (which can include the PIN, transaction type, and the transfer amount.) The request is processed and, if approved, the player receives a cash equivalent ticket in the amount of the requested transfer or the gaming device is credited with the approved amount. This effectively emulates every step that an ordinary ATM does except the output is a ticket or credited credits to a specific gaming device instead of cash. The cash equivalent ticket is redeemable for cash through a ticket redemption machine, cashier station, or kiosk, or for placing credits into a gaming or amusement device that has a card and/or ticket reader. The present invention therefore provides time for the patron to confirm the patron's decision to withdraw the money. The patron can choose to not spend the money, to wager the money, or to spend it in a non-gaming fashion.

The patron can also remove money from their debit card accounts on one machine with the idea of playing the money or credit/ticket at another machine. This enables machines that accept patron cards or tickets, but not debit cards, to accept funds from a debit card transaction. Further, by communicating through the gaming or amusement device host system to the printer that already exists in a gaming or amusement device, the cost of a separate ticket printer is eliminated. Having one printer instead of two reduces the number of printer rolls that the gaming establishments have to stock and reload.

The processor of the gaming or amusement device is still connected to or in communication with the ticket reader/validator and is responsible for verifying validity of the ticket. The EFT system communicates a request to the card and/or ticket system which after authorization of funds transfer, provides credits associated to the card or prints a ticket with a barcode from the gaming or amusement device.

In operation, the patron withdraws money by inserting a payment card into a specific EFT terminal associated with a specific gaming device, selects payment transaction type and account from which he is withdrawing funds, accepts any service charge fees associated with the transaction, and enters a PIN number and an amount The transaction request then goes out through the network to which the EFT terminal is connected (wireless or wired) to the secure payment gateway of the EFT system, which transmits the request through the financial network to process the transaction request, which returns an appropriate response over the financial network back to the secure payment gateway, which routes a specific response back through the appropriate network to the specific EFT terminal assigned to a specific gaming or amusement device or location.

If the patron's money transfer request is approved, the specific EFT terminal will get a message like "Transaction Approved, Please wait for TITO Ticket to be Printed", or the gaming device is automatically credited with the approved amount requested, and it may also print out a separate receipt "evidence" for the ATM transaction from a separate thermal printer as part of the EFT terminal, simultaneously the secure payment gateway of the EFT system communicates to a funds management portal (gaming or amusement gateway) of the EFT system, to specify which specific gaming or amusement device successfully withdrew how much money. The funds management portal then communicates with the slot, table or amusement host system for the specific gaming or amusement device printer to print a ticket for the patron, which the patron can use with any gaming device that will accept such a ticket, or credit the gaming device automatically with approved amount requested. The patron can alternatively redeem the ticket for cash, or request a ticket for the credits.

If the patron's money transfer request is denied for whatever reason, the secure payment gateway of the EFT system will simply send a denial message back to the EFT terminal and request either a different PIN or payment card, or for the patron to cancel and exit the transaction.

Alternative to printing a ticket, the EFT System may tie directly into the credit system of the gaming machine, thereby eliminating one more step of printing and reinserting the ticket back into the machine to play. The patron can simply continue playing with the new credit received, or it can hit the "Cash Out" button for the printer to print the ticket, or transfer the funds directly back to the patron's financial account.

Alternative to printing tickets, the value can also be transferred by the EFT system from the patron's financial account into a stored value player card. The player card can be used in the gaming or amusement device to transfer stored value into credits in the gaming or amusement device, and "Cash Out" back into the player card. Traditional player cards today are typically loyalty cards only and do not contain a stored value aspect that can allow the patron to use the card in an open loop environment to shop or dine anywhere that accepts Visa or Master Card. The proposed invention allows a loyalty card to be coupled with a prepaid debit card into one player card. By allowing a transfer of funds from one's financial account to a player card via the EFT System, the patron can securely use his player card and obtain reward points from the gaming or amusement establishment while the gaming or amusement establishment has a way to maintain loyalty and get to know its patrons' habits better.

Referring to FIG. 1, an electronic fund transfer (EFT) system 100 includes gaming devices 101, 102, 103, gaming credit systems 105a, 105b, 105c, a gaming host system 140, EFT devices 110, a secure payment gateway 120 and a funds management portal 130. Host system (or Casino Management System) 140 is connected to the gaming credit systems 105a, 105b, and 105c via a local network. Each gaming credit system 105a, 105b, and 105c is also connected to a printer 106, 107, or 108, respectively, for printing tickets. EFT terminals 110 are placed in the same locations as the gaming devices 101, 102, 103. EFT terminals 110 communicate with the ATM networks 150 via a network connection. All communications between the EFT terminals 110 and the ATM networks 150 pass through the secure payment gateway 120. The ATM networks 120 provide connections to the patron's financial accounts 151, 152, 153 from where the funds are withdrawn. In one example, the financial account is a bank account. In other examples, financial accounts are online bank accounts, investment account, business, accounts, credit lines, credit card accounts, debit card accounts, or PayPal accounts, among others. Examples of ATM networks include PLUS, STAR, CIRRUS, INTERLINK, MONEY PASS, among others. The fund transfer is communicated back to the secure payment gateway 120 via the ATM networks 150 and the secure payment gateway 120 transmits the fund transfer to the funds management portal 130. The funds management portal 130 receives the fund transfer confirmation from the secure payment gateway 120 and sends it to the gaming host system 140. The gaming host system 140 then transmits the funds to the appropriate gaming credit system 105a, 105b, or 105c that was designated by the patron.

Figure 2:
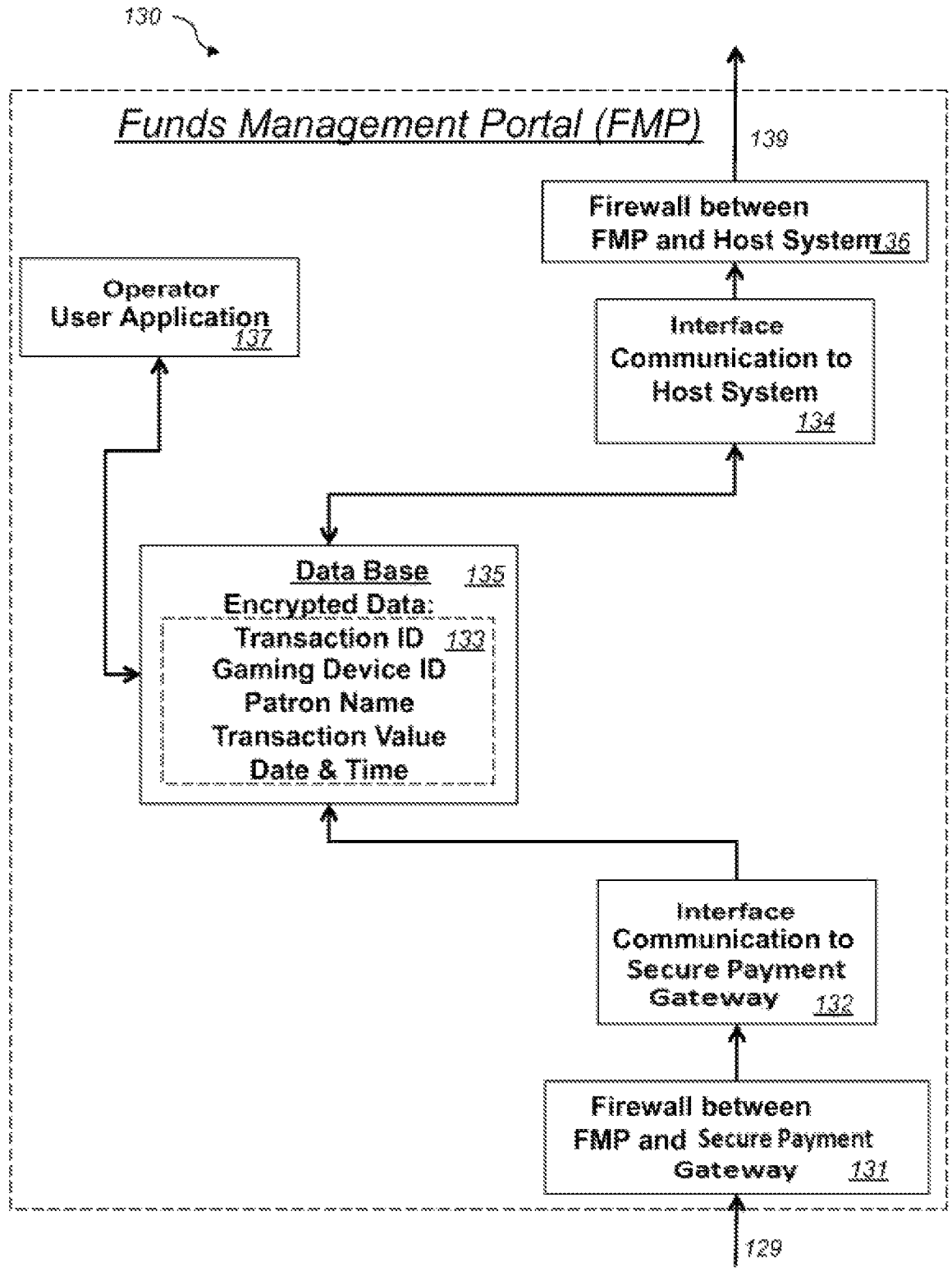
FIG. 2 is a block diagram of the ACS funds management portal of FIG. 1.

Referring to FIG. 2, the funds management portal 130 includes a database 135, firewalls 131 and 136, interfaces 132 and 134, and an operator patron application 137. Firewall 131 is located between the funds management portal 130 and the secure payment gateway 120. Firewall 136 is located between the funds management portal 130 and the gaming host system 140. Interface 132 is for communications between the funds management portal 130 and the secure payment gateway 120. Interface 134 is for communications between the funds management portal 130 and the gaming host system 140. Database 135 includes encrypted data for each transaction 133. The transaction data include a transaction ID, a gaming credit system ID, a gaming device ID, patron's name, transaction value, date, and time.

Figure 3:
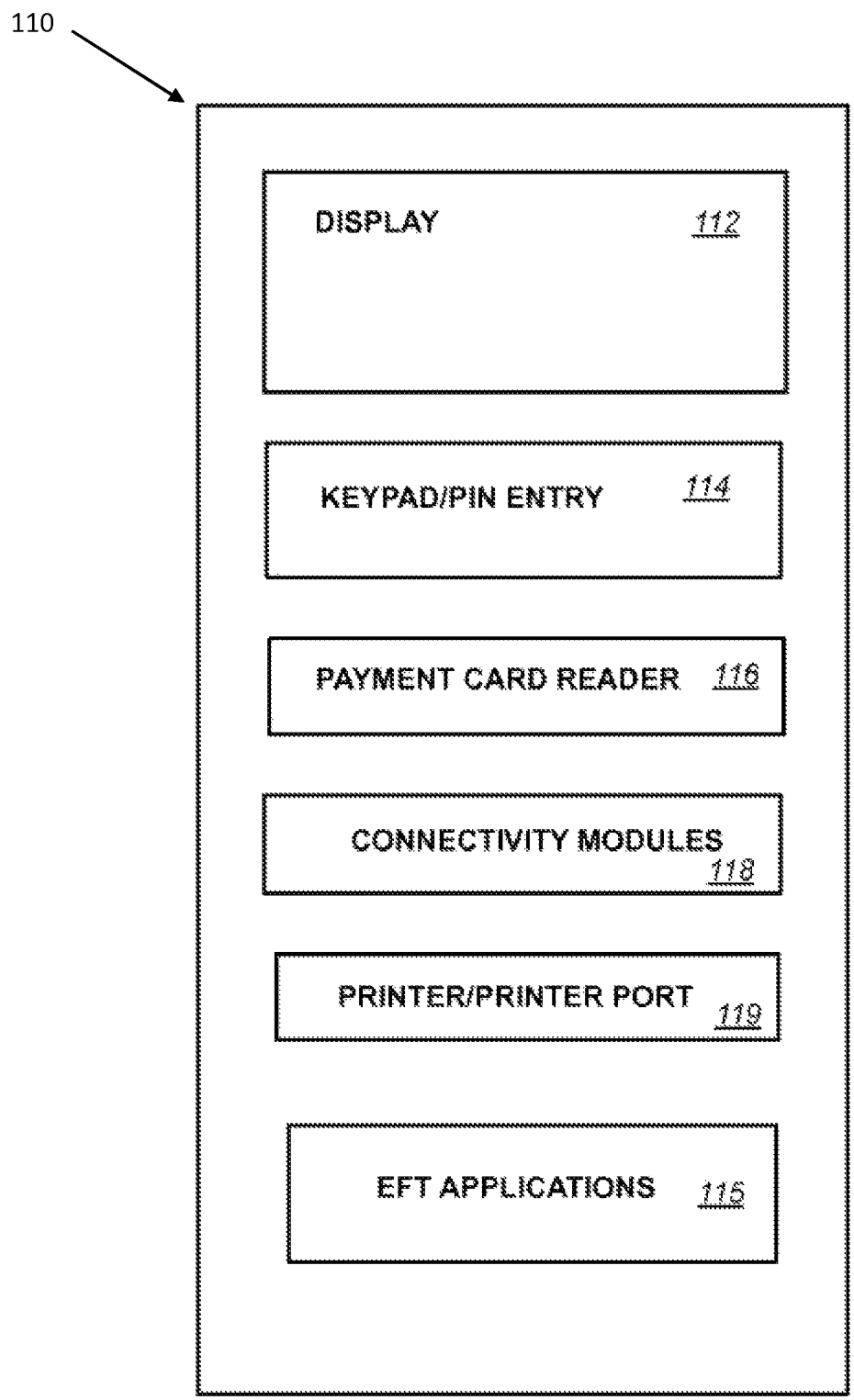
FIG. 3 is a block diagram of the EFT terminal of FIG. 1.

Referring to FIG. 3, an EFT terminal 110 includes a display 112, a keypad/PIN entry 114, a payment card reader 116, connectivity modules 118, a printer and/or printer ports 119, and EFT applications 115. The payment card reader may be a smart card reader, magnetic card reader, contactless card reader, proximity mobile payments reader that enables communication with smart phone devices or contactless proximity card reader that processes secure smart ticketing and electronic payments using contactless secure mobile commerce technology. EFT applications 115 include applications that identify the gaming credit system and gaming device associated with the EFT terminal, ATM network, type of transaction, amount to be transferred, date, time and name of patron.

Referring to back FIG. 1, one or more EFT terminals 110 interact with the secure payment gateway 120 via network connections 111. The secure payment gateway 120 is in contact with the patron's bank accounts 151, 152, 153, via the ATM/Debit networks 150. The ATM networks 150 are connected to the secure payment gateway 120 via a single, secure, access controlled connection 160.

EFT terminals 110 are usually handheld remote communication devices on which the application patron interface is executed. Examples of handheld communication devices include terminals, mobile phones, personal digital assistant (PDA), payment modules, and portable computers, among others. In other embodiments EFT terminals 110 are not handheld devices and may be a personal computer, server or any other computing circuits. EFT components for use with gaming systems may also be an external attachment or embedded in a slot machine or amusement device. EFT terminals may also include remote/mobile/handheld system components or terminals assigned to table games and parlor games. Table game-specific tethered processing terminals may include embedded swipe components fitted to seated game stations in race and sports book, keno and bingo operations, or swipe components embedded into mobile handheld games.

Secure payment gateway 120 is a single, secure pipeline through which the ATM networks 150 and the EFT terminals 110 communicate. EFT terminals 110 are able to contact only secure payment gateway 120 and secure payment gateway 120 controls the communications between the ATM networks 150 (and its potentially sensitive or proprietary data) and those EFT terminals that wish to use it. This enables authentication of the EFT terminal and application as well as encryption and secure transmission of network requests from the EFT terminal 110.

Figure 4:
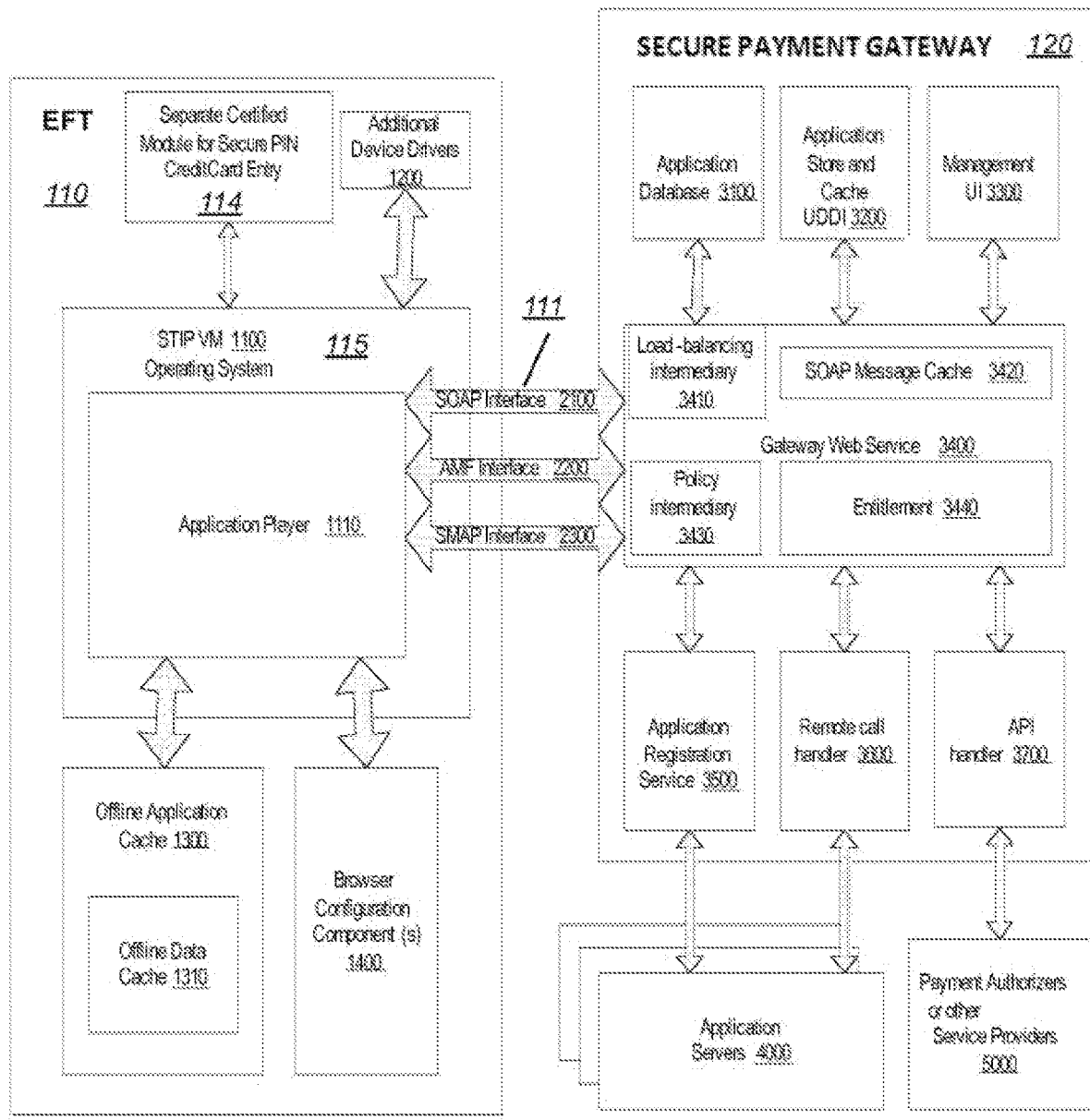
FIG. 4 is a block diagram of the EFT terminal and the secure payment gateway.

Referring to FIG. 3 and FIG. 4, EFT terminal 110 includes an operating system or managed code environment 1100 in which application player 1110 is executed. The managed code environment 1100 is in contact with device drivers 1200. Device drivers 1200 are any hardware access layer modules that allow the player 1110 to access peripheral devices such as card readers 116 or printers 119. Application player 1110 is in contact with browser configuration components 1400 and an offline application cache 1300 with its associated offline application data 1310. The application player 1110 requests functionality from the secure payment gateway 120 through XML messages embedded in Simple Object Access Protocol (SOAP) requests and then interprets the XML messages it receives embedded in SOAP responses from secure payment gateway 120. The application player 1110 has access to a local list of ATM networks it is authorized to request and relevant security keys and settings. The secure payment gateway 120 includes a server-side intermediary 3400 that receives the XML messages embedded in SOAP requests from the player 1110 and sends to the player 1110 XML messages embedded in SOAP responses. As mentioned above, the format of communications between the application player 1110 and the server-side intermediary 3400 is XML and the communication connection is via a SOAP interface 2100.

In one example, the managed code environment 1100 is a Small Technical Interoperability Platform Virtual Machine (STIP VM). Other examples of the managed code environment 1100 include Java 2 Platform Micro Edition (J2ME), .NET and Flash Lite, among others. Operating environment 1100 provides a way for the player 1110 to access operating system resources. The managed code environment 1100 executes the application player 1110, which is in contact with browser configuration components 1400 and an offline application cache 1300 with its associated offline application data 1310. Offline application cache 1300 is a set of applications (XML files) that this player instance has downloaded. Offline data cache 1310 is the set of stored web service calls that each application has saved for later execution on the application server host. These stored web service calls enable the offline functionality. Browser Configuration Components 1400 is a set of device-specific parameters that the player 1110 and its applications use to tailor the patron's experience of applications. These configuration components are locally stored name-value pairs that can be managed both locally and remotely via the server 3000. Examples of browser configuration parameters include, maximum size of the offline cache, auto-player-update on/off, auto-application-update on/off, and debug logging on/off, among others.

Referring again to FIG. 4, secure payment gateway 120 includes a server-side intermediary or gateway web service 3400 through which all communications to and from the EFT terminals 110 pass. The server-side intermediary 3400 has access to a database with a table that associates Global Unique Identifiers (GUIDs) with the remote ATM networks. The Gateway web service 3400 comprises one or more server-side machines that act as intermediaries between the EFT terminals 110 and the application servers 4000 which host the ATM networks that provide bank account access to the EFT terminals 110. These one or more server-side machines include a load-balancing intermediary 3410, a SOAP message cache 3420, a policy intermediary 3430 and an entitlement module 3440. The load-balancing intermediary 3410 is designed to facilitate the demands of numerous EFT terminals 110 simultaneously by dispatching requests evenly among the various server-side machines that comprise the secure payment gateway 120. The SOAP Message Cache 3420 is a queue of SOAP messages to be executed by the server whose results will typically be passed back to an EFT terminal 110. The policy intermediary 3430 ensures that only authorized patrons on authorized EFT terminals can access the requested ATM networks and bank accounts. The entitlement module 3440 controls the access that a request has to the resources it desires. Fine grained web service access control is enabled by this entitlement module.

The Gateway web service 3400 is in communication with an application database 3100, an application store and cache 3200, a management UI 3300, an application registration service 3500, a remote call handler 3600 and an API handler 3700. The application database 3100 includes a set of application XML files representing the currently available applications in the system. The application database 3100 cross-references Globally Unique Identifiers (GUIDS) sent by the client application player 1110 with the XML patron interface of the requested ATM network and bank account. The application store and cache 3200 is an interface into the application database 3100 that conforms to the Universal Description Discovery and Integration (UDDI) discovery standards for machine readable service functionality discovery. Management Patron Interface (UI) 3300 is a set of web application screens that allow data center administrators to control the use of the system, for example, allowing or disallowing access to a particular ATM network, or promoting an application from test to production. The Application Registration Service 3500 is the module that allows the developer to publish an application from the Integrated Development Environment (IDE). The remote call handler 3600 executes properly authenticated web service calls and the Application Program Interface (API) handler 3700 is an interface that external services 5000 (like payment processors) implement in order to be accessed from within the system.

Secure payment gateway 120 securely handles interaction between the EFT terminals 110 and the application servers 4000 which host the ATM network web services that provide access to the patron's financial accounts, and between the EFT 110 and any supporting applications 5000. All data processing and other calculations and manipulations are executed by ATM network web services hosted on application servers 4000. The patron's experience on the EFT terminal 110 comprises only display of an XML patron interface and subsequent display of application results, also received in the form of XML.

Secure payment gateway 120 provides a single, secure, access-controlled and actively managed channel from the application running on the EFT terminal to the (one or more) ATM network web services. Since the player 1110 communicates only with the secure payment gateway 120, applications running on the EFT terminal 110 cannot connect with unauthorized web applications and are therefore secure. The system is secure along all links via the use of industry standard link encryption and access controlled at all interfaces via the use of industry-standard patron authentication. Link encryption refers to communications security protocols that encrypt and decrypt all traffic at each end of a communications line. Examples of industry standard link encryptions include secure HTTP (S-HTTP), web-services security (WS-S) and Way Systems Secure mobile application platform (WS-SMAP), among others. Patron authentication refers to the process of establishing or confirming the digital identity of a patron or device such as the EFT terminal 110 or the servers 4000 and 5000. Examples of industry standard patron authentication include WS-S, lightweight directory access protocol (LDAP) and proprietary device authentication, among others.

Secure payment gateway 120 provides fine-grained access control over web service (WS) access organized by remote-patron and remote-device that spans multiple WS hosts and organizations and requires no instrumentation of the individual web services. As was mentioned above, secure payment gateway 120 maintains access-control lists that relate patrons and EFT terminals to individual ATM network web services and provide for granting and denying access by those patrons to those services. These lists contain the unique combination of GUIDS and the identity of remote ATM network web services available to the EFT terminals 110.

A key feature of application security best-practice is the concept of non-repudiation. Non-repudiation is defined as the ability of a component to prove that a particular action of that component was driven by an interaction with another component rather than by some invisible, internal process of that component. The key enabler of non-repudiation is auditing, the storage of a trail of actions and data that can easily be used to reconstruct the interactions of the components of the system. The secure payment gateway 120 provides a complete audit trail of the interaction of ATM network web services with the remote EFT terminals 110, thus ensuring non-repudiation. This audit trail identifies the EFT terminal, the patron, and the details of the underlying remote connection to the terminal. In one implementation, fine-grained access control and auditing enable the secure payment gateway 120 to bill patrons at an equally fine-grained level. This enables tiered service by enterprises implementing the system where patrons can be billed for individual calls within a session rather than at the more coarse system of billing for time spent within the application.

Figure 5:
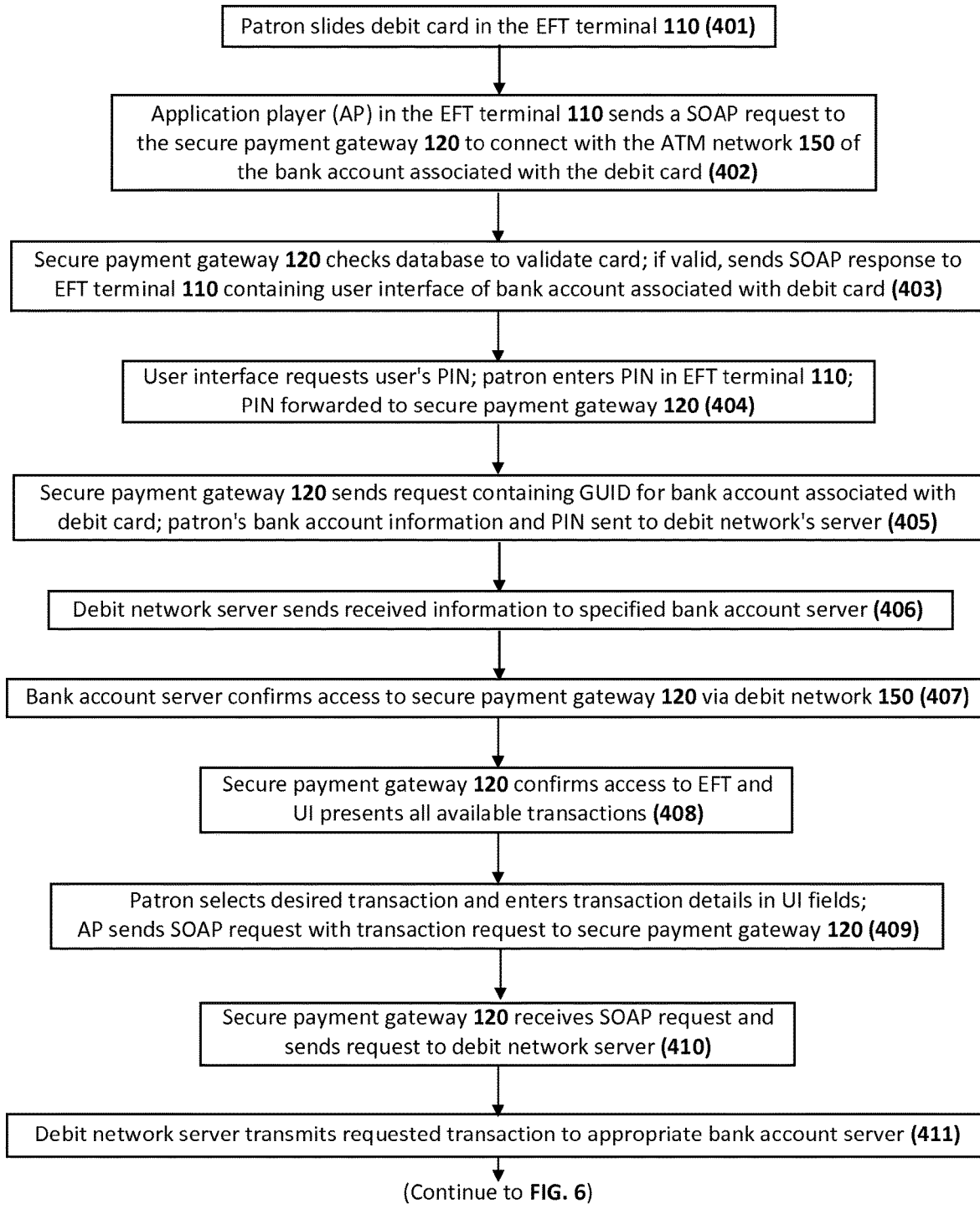
FIG. 5 and FIG. 6 depict the flow diagram of the EFT process.
Figure 6:
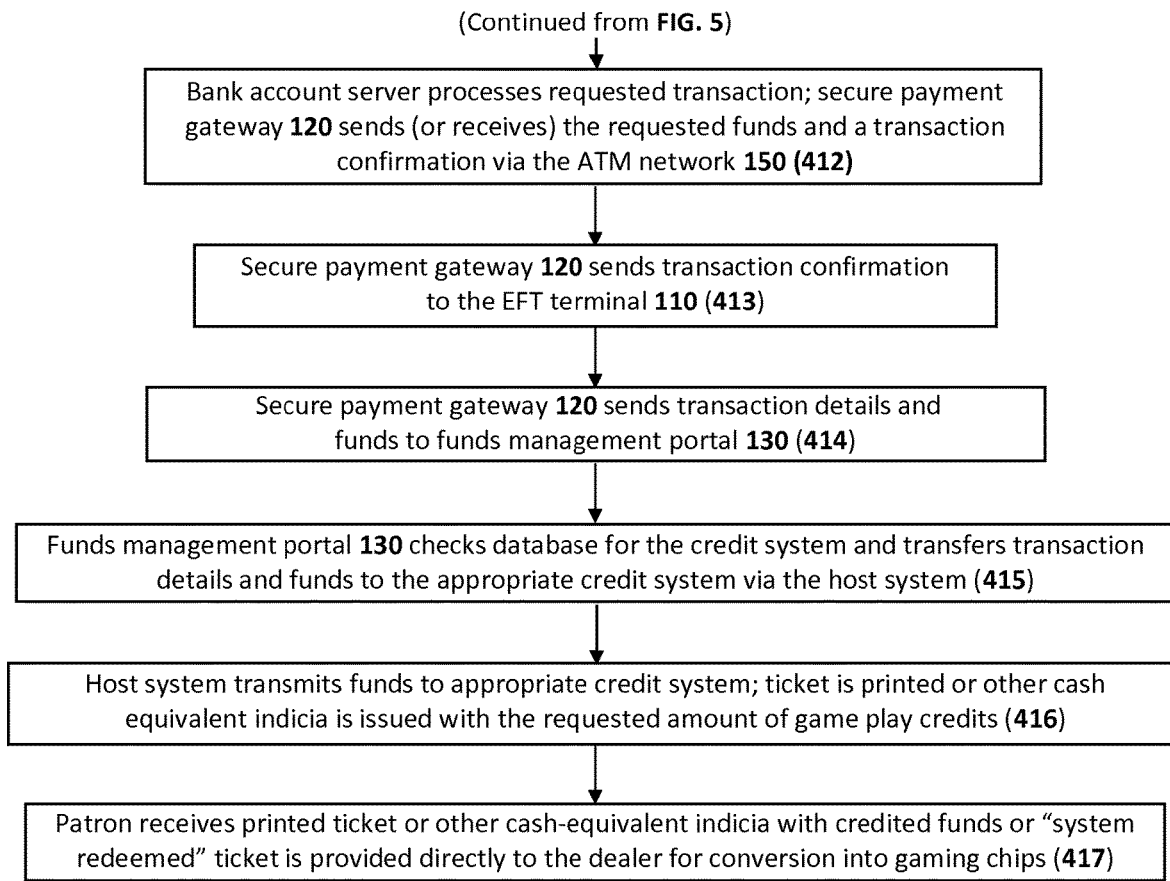

In operation, a patron starts the application player 1110 on the EFT terminal 110. The application player 1110 consults first the offline application cache 1300 and presents a list of those applications which this EFT terminal 110 and patron are authorized to execute. Referring to FIG. 5 and FIG. 6, if the EFT terminal 110 and the secure payment gateway 120 are both actively connected to the network, the process includes the following steps. First, a patron slides a debit card in the EFT terminal (401). This action starts an application player (AP) in the EFT device and the AP sends a SOAP request to the secure payment gateway intermediary server (IS) to connect with the ATM network of the bank account associated with the debit card (402). The IS checks a database and if this is an acceptable debit card it sends a SOAP response to the EFT terminal containing the patron interface (UI) of the bank account associated with the debit card (403). The UI requests a patron name and a PIN, the patron enters his patron name and PIN and the information is sent to the IS (404). Next, the IS sends to the debit network server a request containing a GUID for the bank account associated with the debit card, the patron's bank account information, and the patron's PIN (405). The debit network server forwards the received information to the specified bank server (406) and the bank server confirms access to the secure payment gateway IS via the debit network (407). The secure payment gateway IS confirms access to EFT and the UI presents all available transactions (408). Examples of the available transactions include fund transfer, withdrawal, deposit and balance inquiry, among others. The patron selects a desired transaction and enters the transaction details in the corresponding UI fields. The AP then sends a SOAP request to IS with the requested transaction (409). Typical transaction details include, amount, currency, gaming device, among others. The IS receives the SOAP request, determines appropriate debit network server for the requested transaction and sends the request to the debit network server (410). The debit network server transmits the request to the appropriate bank server (411) and the bank server processes the requested transaction, sends (or receives) the requested funds and a transaction confirmation to the IS via the ATM network (412). Next, the IS sends the transaction confirmation to the EFT terminal (413) and the transaction details and funds to the funds management portal (414). The funds management portal checks its database for the appropriate gaming device/ticket printer and transfers the transaction details and funds to the appropriate gaming device/ticket printer via the host system (415). The host system then transmits the funds to a gaming credit system and a ticket printer associated with the appropriate EFT terminal and the printer prints a ticket with the requested amount (416). The patron receives the printed ticket with the credited funds and uses it in the gaming device or cashes it out (417).

A typical network connection between secure payment gateway intermediary server (IS) 120 and the external web services is HTTPS/TCP/IP over the public Internet. Other examples of physical networks supported include, GSM, iDEN, D-AMPS, cdmaOne, PDC, CSD, PHS, GPRS, HSCSD, WiDEN, CDMA2000 1xRTT, EDGE, W-CDMA, UMTS, FOMA, CDMA2000 1xEV, TD-SCDMA, UMA, HSUPA, HSUPA, SONET, Ethernet, Ethernet V2, X.21, and ISDN, among others.

Other implementations of the invention may replace the SOAP 2100 with Action Script Message Format (AMF) 2200 or SMAP 2300. SOAP interface 2100 is one of the potential mechanisms by which the player and server communicate. Only one of 2100, 2200 or 2300 is used in any player deployment. SOAP is an object oriented Remote Procedure Call (RPC) formatted in XML. AMF 2200 is another communication protocol, currently favored by Macromedia Flash. SMAP 2300 is a communication protocol proprietary to Way Systems that includes transport layer and application layer functionality (i.e., authentication).

Several embodiments of the present invention have been described. While the disclosure has been described with reference to an exemplary embodiment, it will be understood by those skilled in the art that various changes may be made and equivalents may be substituted for elements thereof without departing from the scope of the disclosure. In addition, many modifications may be made to adapt a particular situation or material to the teachings without departing from the essential scope thereof. Therefore, it is intended that the disclosure not be limited to the particular embodiments disclosed as the best mode contemplated for carrying out this disclosure.

What is claimed is:

1. A system for purchasing credits via electronic funds transfer, the system comprising:
   a gateway providing system access to a network associated with a patron financial account, wherein the gateway includes a database containing data for at least one transfer of funds including: a patron name or identifier, an operator name or identifier, a transfer value, a date, and a time;
   an electronic funds transfer terminal in communication with the gateway and configured to originate an electronic funds transfer associated with the patron financial account; and
   at least one credit system communicatively connected to the gateway and configured to dispense credits suitable for use with at least one casino game to the patron upon receipt of authorization originating from the gateway;
   wherein the system is configured to route the electronic funds transfer request from the electronic funds transfer terminal to the network associated with the patron financial account via the gateway, receive authorization for an electronic funds transfer at the gateway, communicate, from the gateway to the at least one credit system, an authorization to dispense credits, and dispense, by the at least one credit system, credits suitable for use with the at least one casino game to the patron.

2. The system of claim 1 wherein all communications between the electronic funds transfer terminal and the network associated with the patron financial account pass through the gateway and are not accessible to a computing device and the at least one credit system.

3. The system of claim 1 wherein all communications between the gateway and the at least one credit system are not accessible to the electronic funds transfer terminal.

4. The system of claim 1 wherein the gateway is further configured to provide accounting and reconciliation of all interactions between the network associated with the patron financial account and the electronic funds transfer terminal.

5. The system of claim 1 wherein the electronic funds transfer terminal further comprises at least one of a Payment Card Industry (PCI) certified device, a PIN entry device (PED) certified device, a point-of-sale (POS) personal identification number (PIN) entry keypad, a payment card reader, a display, a network connectivity module, a printer, a printer port, a mobile application, a client-side application, and a electronic funds transfer application.

6. The system of claim 5 wherein the payment card reader comprises a smart card reader, a magnetic card reader, a contactless card reader, or a contactless proximity card reader.

7. The system of claim 1 wherein the gateway is further configured to communicate a confirmation or denial of the electronic fund transfer request to the electronic funds transfer terminal and the electronic funds transfer terminal is further configured to receive from the gateway the communication of confirmation and denial of the electronic fund transfer request, and display to the patron the confirmation and denial of the electronic fund transfer request.

8. The system of claim 1 wherein the gateway is further configured to communicate a confirmation and denial of the electronic fund transfer request to the electronic funds transfer terminal and the electronic funds transfer terminal is further configured to receive from the gateway the confirmation and denial of the electronic fund transfer request, and provide confirmation and denial of the electronic fund transfer request to the patron in the form of a printed receipt.

9. The system of claim 1 wherein the at least one credit system is configured to dispense credit to the patron in the form of a redeemable voucher.

10. The system of claim 1 wherein the at least one credit system is configured to dispense credit to the patron in the form of casino chips.

11. The system of claim 1 wherein the network associated with the patron financial account comprises one of PLUS, STAR, CIRRUS, INTERLINK, MONEY PASS or NYCE networks.

12. The system of claim 1 wherein the EFT terminal is a mobile handheld device that is remote from the casino game.

13. A method for purchasing credits via electronic funds transfer, the method comprising:
 providing at least one casino game;
 providing a gateway including a database containing data for at least one transfer of funds, wherein the data includes a patron name or identifier, an operator name or identifier, a transfer value, a date, and a time;
 providing an electronic funds transfer terminal in communication with the gateway;
 providing, by a patron via the electronic funds transfer terminal, instructions to initiate an electronic funds transfer from a patron financial account;
 generating, by the electronic funds transfer terminal, a request for an electronic funds transfer using the instructions to initiate an electronic funds transfer;
 communicating the request for an electronic funds transfer from the electronic funds transfer terminal to the gateway;
 communicating the request for an electronic funds transfer from the gateway to a financial server associated with the patron financial account via a network associated with the financial server;
 receiving, by the gateway, an electronic funds transfer from the financial server via the network associated with the financial server;
 communicating the electronic funds transfer from the gateway to a computing device;
 generating, at the gateway, an authorization to dispense credits to the patron;
 communicating the authorization to dispense credits from the gateway to a credit system; and
 dispensing credits to the patron via the credit system.

14. The method of claim 13 wherein the steps of providing instructions to initiate an electronic funds transfer, generating a request for an electronic funds transfer, and communicating the request for an electronic funds transfer further comprise the use of at least one of a payment card industry (PCI) certified device, a PIN entry device (PED) certified device, a point-of-sale (POS) personal identification number (PIN) entry keypad, a payment card reader, a smart card reader, a magnetic card reader, a contactless card reader, a contactless proximity card reader, a display, a network connectivity module, a printer, a printer port, a mobile application, a client-side application, and an electronic fund transfer application.

15. The method of claim 13 wherein the step of providing instructions to initiate an electronic funds transfer further comprises:
 inserting a payment card into an electronic funds transfer terminal;
 selecting payment transaction type and account;
 entering a personal identification number (PIN); and
 indicating acceptance of any service charge fees.

16. The method of claim 13 further comprising a step whereby the gateway communicates confirmation and denial of the electronic fund transfer request to the electronic funds transfer terminal and the electronic funds transfer terminal displays the confirmation and denial of the electronic fund transfer request to the patron.

17. The method of claim 13 further comprising a step whereby the gateway communicates confirmation and denial of the electronic fund transfer request to the electronic funds transfer terminal and the electronic funds transfer terminal provides confirmation or denial of the electronic fund transfer request to the patron in the form of a printed receipt.

18. The method of claim 13 further comprising a step whereby the computing device provides accounting and reconciliation of all transfers of electronic funds and for all authorizations to dispense credits to patrons.

19. The method of claim 13 further comprising a step whereby the gateway provides accounting and reconciliation of all interactions between the network associated with the financial server and the electronic funds transfer terminal.

20. The method of claim 13 wherein the step of dispensing gaming or amusement credits to the patron comprises dispensing credit in the form of a redeemable voucher.

21. The method of claim 13 wherein the step of dispensing gaming or amusement credits to the patron comprises dispensing credit in the form of casino chips.

22. The method of claim 13 wherein the network associated with the financial server comprises one of PLUS, STAR, CIRRUS, INTERLINK, MONEY PASS or NYCE networks.

23. The system of claim 13 wherein the EFT terminal is a mobile handheld device that is remote from the casino game.

* * * * *